(12) United States Patent
Lev et al.

(10) Patent No.: US 7,686,466 B2
(45) Date of Patent: Mar. 30, 2010

(54) ELECTRONIC DEVICE ILLUMINATOR

(75) Inventors: Jeffrey A. Lev, Cypress, TX (US); Paul J. Doczy, Cypress, TX (US); Stacy L. Wolff, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 178 days.

(21) Appl. No.: 11/789,672

(22) Filed: Apr. 24, 2007

(65) Prior Publication Data
US 2008/0266865 A1 Oct. 30, 2008

(51) Int. Cl.
*G01D 11/28* (2006.01)
(52) U.S. Cl. .......................... 362/23; 362/165; 362/177; 362/197; 362/269; 362/374
(58) Field of Classification Search .................. 362/23, 362/269–271, 427, 428, 165, 177, 197, 374
See application file for complete search history.

(56) References Cited

U.S. PATENT DOCUMENTS

| 5,379,201 | A | 1/1995 | Friedman |
| 5,684,513 | A | 11/1997 | Decker |
| 5,793,358 | A | 8/1998 | Petkovic et al. |
| 5,815,225 | A | 9/1998 | Nelson |
| 5,868,487 | A | 2/1999 | Polley et al. |
| 6,040,822 | A | 3/2000 | Decker |
| 6,145,992 | A | 11/2000 | Wattenburg |
| 6,161,944 | A | 12/2000 | Leman |
| 6,380,921 | B2 * | 4/2002 | Nakamura ................... 345/102 |
| 6,474,823 | B1 * | 11/2002 | Agata et al. ................... 362/26 |
| 6,561,668 | B2 | 5/2003 | Katayama et al. |
| 6,834,975 | B2 * | 12/2004 | Chu-Chia et al. ............. 362/84 |
| 7,436,657 | B2 * | 10/2008 | Motai et al. ............. 361/679.55 |
| 2001/0043188 | A1 * | 11/2001 | Nakamura ................... 345/102 |
| 2002/0064055 | A1 | 5/2002 | Takahashi et al. |
| 2002/0085371 | A1 * | 7/2002 | Katayama et al. ............. 362/85 |
| 2007/0103918 | A1 * | 5/2007 | Lin ............................ 362/427 |
| 2007/0236908 | A1 * | 10/2007 | Yukawa et al. ................. 362/23 |
| 2007/0253182 | A1 * | 11/2007 | Motai et al. .................... 362/23 |

FOREIGN PATENT DOCUMENTS

| KR | 20-0173633 | 3/2000 |
| KR | 20-0329776 | 10/2003 |

* cited by examiner

*Primary Examiner*—Sandra L O'Shea
*Assistant Examiner*—Evan Dzierzynski

(57) ABSTRACT

An electronic device illuminator comprises a light assembly pivotally coupled to a housing of an electronic device.

20 Claims, 2 Drawing Sheets

ELECTRONIC DEVICE ILLUMINATOR

BACKGROUND

Electronic devices, such as laptop or notebook computers, are oftentimes utilized in dark environments, thereby making it difficult to view and/or utilize the device's working surface (e.g., the keyboard or touch pad). Lighting systems have been devised to facilitate use of electronic devices in dark environments; however, such systems are unable to adequately direct light to the desired location and are susceptible to damage for some types of electronic devices (e.g., when transitioning a notebook computer type of electronic device to a closed position).

DETAILED DESCRIPTION OF THE DRAWINGS

Figure 1:
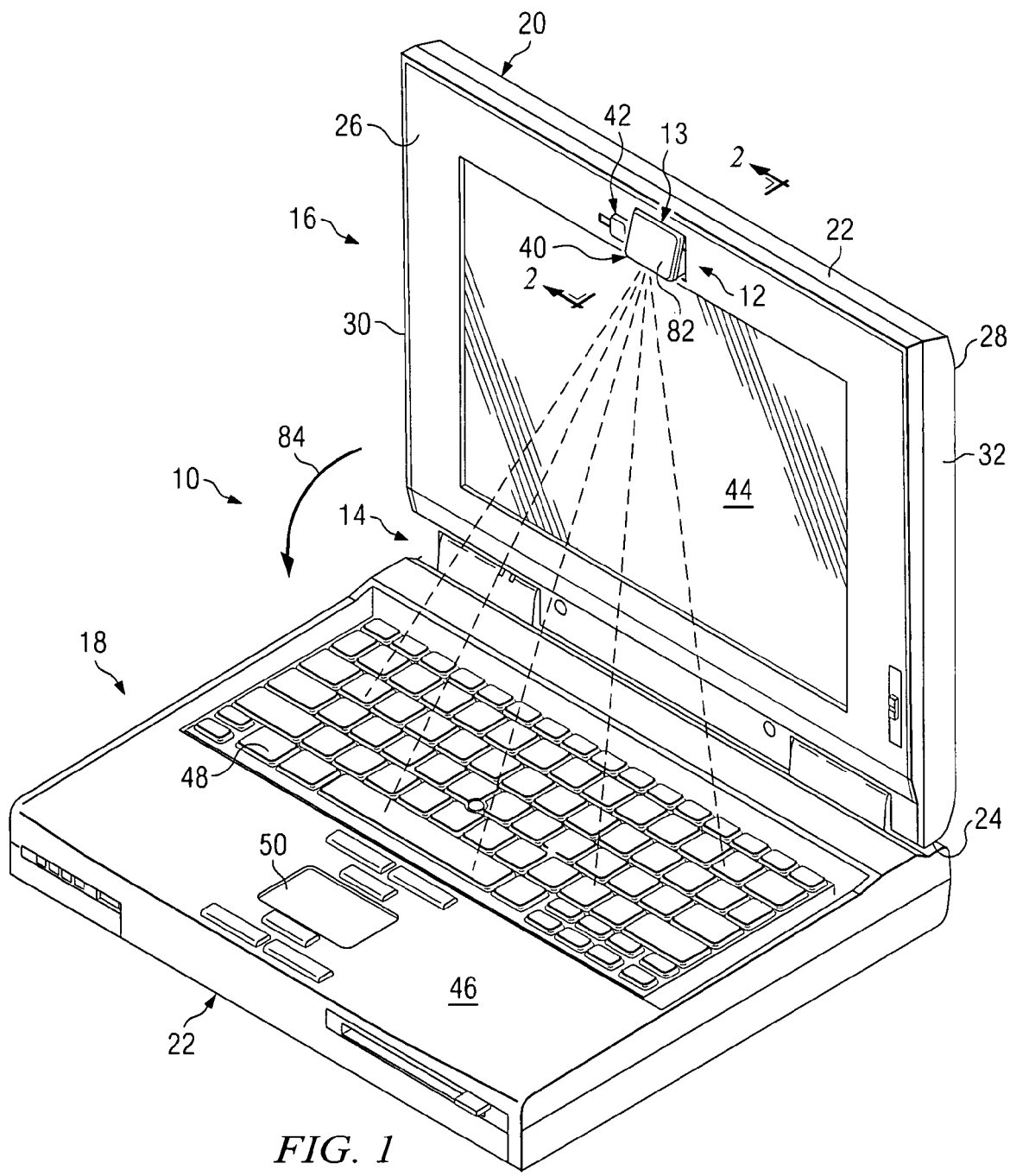
FIG. 1 is a diagram of a perspective view of an electronic device employing an illuminator to advantage.
Figure 2A:
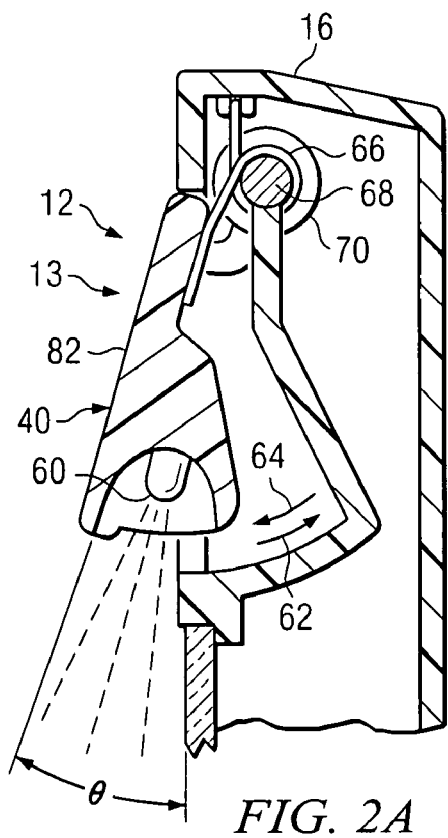
FIG. 2A is a diagram illustrating the illuminator in an extended position taken along the line 2-2 of FIG. 1.
Figure 2B:
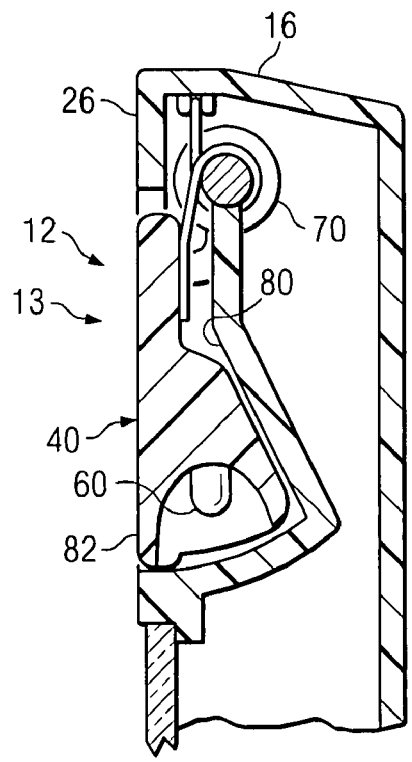
FIG. 2B is a diagram illustrating the illuminator in a retracted position taken along the line 2-2 of FIG. 1.
Figure 3:
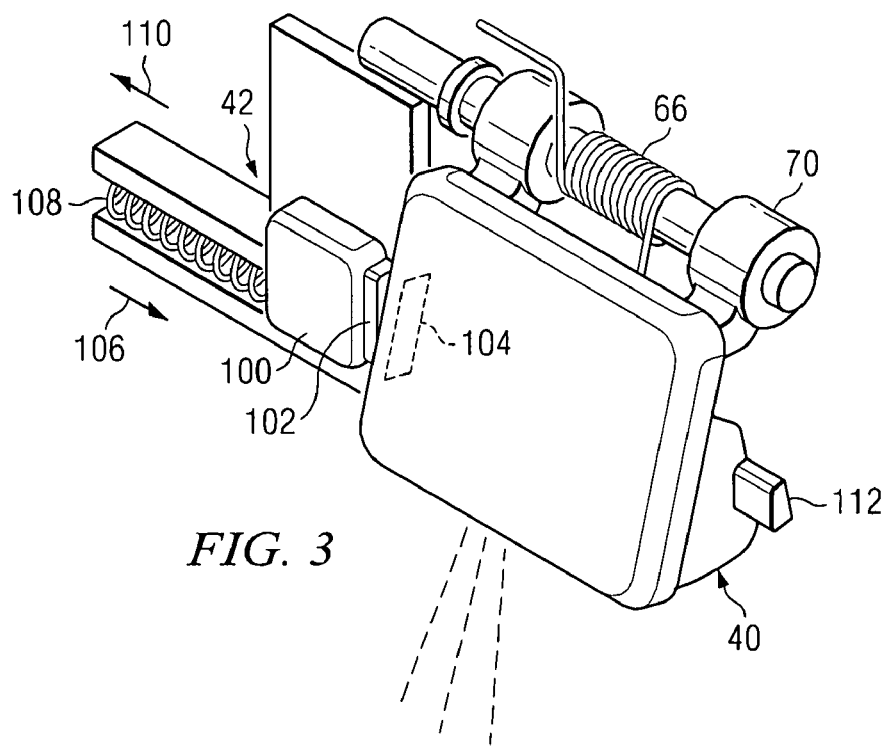
FIG. 3 is a diagram illustrating a locking mechanism for the illuminator of FIG. 1.

Various embodiments and the advantages thereof are best understood by referring to FIGS. 1-3, like numerals being used for like and corresponding parts of the drawing.

FIG. 1 is a diagram of a perspective view of an electronic device 10 employing an embodiment of an illuminator 12 to advantage. In the embodiment illustrated in FIG. 1, electronic device 10 comprises a laptop or notebook computer 14; however, it should be understood that electronic device 10 may comprise any type of electronic device such as, but not limited to, a tablet personal computer, a personal digital assistant, a desktop computer, a gaming device, a digital video disk (DVD) player, a radio, a television, a coffee maker, or any other type of portable or non-portable electronic device. In the embodiment illustrated in FIG. 1, electronic device 10 comprises a display member 16 rotatably coupled to a base member 18 to enable variable positioning of display member 16 relative to base member 18. Display member 16 and base member 18 each comprise a housing 20 and 22, respectively, formed having a number of walls. For example, housing 20 comprises a top wall 22, a bottom wall 24, a front wall/bezel 26, a rear wall 28 and a pair of sidewalls 30 and 32 for receiving and/or supporting a display screen 44. Illuminator 12 comprises a light source to illuminate a working surface 46 of base member 18. For example, when electronic device 10 is utilized in dark environments, illuminator 12 is operable to illuminate a keyboard 48 and/or a touch pad 50 disposed on working surface 46 for viewing and use by an operator of electronic device 10.

In FIG. 1, illuminator 12 comprises a light assembly 13 having a housing 40 and a light source 60 (FIGS. 2A and 2B). In the embodiment illustrated in FIG. 1, light assembly 13 is pivotably coupled to display member 16 and securable within housing 20 of display member 16 by a locking mechanism 42. In the embodiment illustrated in FIG. 1, light assembly 13 is disposed on bezel 26 at a medial location above display screen 44; however, it should be understood that light assembly 13 may be otherwise located (e.g., at any other position on bezel 26 or on wall 22, 30 and/or 32). It should be understood that light assembly 13 may also be pivotably coupled to base member 18.

FIG. 2A is a diagram illustrating illuminator 12 in an extended position taken along the line 2-2 of FIG. 1. When in the extended orientation, housing 40 extends outwardly from display member 16 to expose light source 60 to illuminate working surface 46 (FIG. 1). In the embodiment illustrated in FIG. 2A, light source 60 comprises at least one light emitting diode disposed within housing 40; however, it should be understood that other types of light sources including, but not limited to, light bulbs, black light sources, etc., may be used.

In FIG. 2A, housing 40 is pivotably coupled to display member 16 to facilitate movement of housing 40 in the direction of arrows 62 and 64. According to some embodiments, housing 40 is outwardly biased by a biasing mechanism 66 to expose light source 60 and enable illumination of working surface 46. In the embodiment illustrated in FIG. 2A, biasing mechanism 66 comprises a torsion spring 68; however, it should be understood that biasing mechanism 66 may be any type of biasing mechanism to outwardly bias housing 40, and thus light source 60, from display member 16.

FIG. 2B is a diagram illustrating illumination device 12 in a retracted or stored position taken along the line 2-2 of FIG. 1. In the embodiment illustrated in FIG. 2B, housing 40 is locatable within a recessed area 80 of display member 16. In the embodiment illustrated in FIG. 2B, when illuminator 12 is configured in the retracted or stored position, a front surface 82 of housing 40 is flush (flush or substantially flush) with a forwardly facing surface of bezel 26. Accordingly, housing 40 is storable within recessed area 82 and thus within the profile of display member 16 to enable electronic device 10 to be configured in a closed position. As used herein, a "closed position" of electronic device 10 shall mean when display member 16 is located in a position substantially parallel and/or coplanar with base member 18 (FIG. 1) such that display member 16 is disposed in contact with or directly adjacent to working surface 46 of electronic device 10. However, it should be understood that in some embodiments, housing 40 may extend slightly outwardly from bezel 26 and/or housing 20 such that housing 40 is at least partially disposed within housing 20 in a retracted position.

In the embodiment illustrated in FIGS. 1-2B, light assembly 13 is positionable in the extended position such that light source 60 is disposed at an angle θ relative to display member 16 to direct light to desired portions of working surface 46. In FIGS. 1-2B, light assembly 13 is pivotably coupled to housing 40 via a hinge 70 (FIGS. 2A and 2B) to facilitate pivotable movement between the extended and retracted positions. According to some embodiments, hinge 70 may be a ratchet-like hinge 70 so that light source 60 can be fixed or positioned in a plurality of different angular extended positions relative to display member 16 and/or working surface 46 to direct light to desired portions of working surface 46. In other embodiments, light assembly 13 may be configured to be located in two positions, namely, a fully extended position and a retracted or stored position.

According to some embodiments, housing 40 is automatically insertible within recessed area 80 in response to transitioning electronic device 10 to the closed position. For example, in the embodiment illustrated in FIGS. 1-2B, when transitioning electronic device 10 to the closed position, front surface 82 of housing 40 contacts and/or otherwise engages working surface 46 such that movement of display member 16 in the direction of arrow 84 (FIG. 1) forces housing 40 into recessed area 82 (FIG. 2B) for storage therein.

FIG. 3 is a diagram illustrating locking mechanism 42 of FIG. 1. In the embodiment illustrated in FIG. 3, locking mechanism 42 comprises a slideable latch 100 having an extension 102 insertable within a corresponding recess 104 disposed on housing 40 to secure housing 40 in the stored orientation. In the embodiment illustrated in FIG. 3, latch 100 is biased in the direction of arrow 106 via a biasing mechanism 108 to facilitate positioning of extension 102 within corresponding recess 104. To configure illuminator 12 in the extended position, locking mechanism 42 is unlocked by sliding latch 100 in the direction of arrow 110 to remove extension 102 from recessed area 104. Upon removal of extension 102 from recessed area 104, biasing mechanism 66 exerts a force on housing 40 to outwardly position housing 40 and thus light source 60 (FIGS. 2A and 2B) in the extended position, as illustrated in FIGS. 1, 2A and 3. According to some embodiments, housing 40 comprises a stop member 112 configured to engage an interior surface or other portion of front wall/bezel 26 to limit outward rotational movement of housing 40 when locking mechanism 42 is actuated to release illuminator 12 to the extended position. It should be understood that locking mechanism 42 may be otherwise configured. For example, in some embodiments, locking mechanism 42 may be configured as a push-push mechanism or other type of mechanism such that housing 40 may be pressed by a user slightly inwardly to cause housing 40 to release from its stored/retracted position and extend outwardly relative to housing 20.

Further, according to some embodiments, light source 60 is automatically illuminated in response to illuminator 12 being in an extended position and automatically turned off in response to housing 40 being located in a stored or retracted position within recessed area 82 (e.g., in response to transitioning electronic device 10 to the closed position). Additionally and/or alternatively, light source 60 may be manually turned on and/or off by a user.

Thus, embodiments provide an illuminator 12 comprising a light assembly 13 pivotably coupled to electronic device 10 to illuminate a working surface 46 when in an extended position and storable within housing 20 of electronic device 10 when in a retracted position. Embodiments also provide a light assembly 13 having a light source 60 disposed at an angle relative to display member 16 to direct light to desired portions of working surface 46. Furthermore, embodiments provide an illuminator 12 storable within housing 20 of electronic device 10 in response to transitioning electronic device 10 to the closed position.

What is claimed is:

1. An electronic device illuminator, comprising:
   a light assembly pivotally coupled to a housing of an electronic device; and
   a biasing mechanism that moves the light assembly from the housing when a display of the electronic device is moved to an open position, wherein the light assembly is pivotally coupled to the housing with a ratchet-like hinge so a light source is movable to a plurality of angular extended positions.

2. The electronic device illuminator of claim 1, further comprising a locking assembly that locks the light assembly in a stored position in the display.

3. The electronic device illuminator of claim 1, wherein the light assembly is coupled to the housing via a ratchet-like hinge.

4. The electronic device illuminator of claim 1, further comprising a locking mechanism to secure the light assembly at least partially within the housing, wherein the locking assembly includes a slideable latch having an extension that inserts within a recess of a housing of the light assembly to lock the light assembly in a stored position.

5. The electronic device illuminator of claim 1, wherein the light assembly is positionable in a plurality of different angular extended positions relative to the housing.

6. The electronic device illuminator of claim 1, wherein the light assembly comprises a light source that is automatically activated in response to the light assembly being moved from a retracted position to an extended position.

7. An electronic device comprising:
   a display member rotatably coupled to a base member to enable variable positioning of the display member relative to the base member; and
   a light assembly pivotably coupled to the display member and including a biasing mechanism that pivotally moves the light assembly to an open position away from the display, wherein the light assembly is securable with a ratchet-like hinge in a plurality of different angular extended positions relative to the display member.

8. The electronic device of claim 7, wherein the light assembly further includes a locking assembly that locks the light assembly in a closed position with a housing of the light assembly flush with a housing of the display member.

9. The electronic device of claim 7, further comprising a locking mechanism to secure the light assembly in a locked position within a recess located in the display member.

10. The electronic device of claim 7, wherein the light assembly is automatically pivoted from an extended position to a retracted position in response to transitioning the display member to a closed position.

11. The electronic device of claim 7, wherein the light assembly is coupled to the display member via a ratchet-like hinge.

12. A method of assembly an electronic device, comprising:
   rotatably coupling a display member to a base member to enable variable positioning of the display member relative to the base member; and pivotably coupling a light assembly to the display member, the light assembly including a locking mechanism that locks the light assembly to a closed position within the display member and a biasing mechanism that biases the light assembly open to an open position away from the display member, further comprising pivotably coupling the light assembly to the display member via a ratchet-like hinge.

13. The method of claim 12, further comprising coupling the light assembly within a recess located in the display member so the light assembly is within a profile of the display member when the light assembly is in a retracted position.

14. The method of claim 12, wherein the locking mechanism secures the light assembly in the closed position so a housing of light assembly is flush with a housing of the display member.

15. The method of claim 12, further comprising pivotably coupling the light assembly to the display member such that in response to transitioning the electronic device to a closed position, the light assembly is stored within the display member.

16. The method of claim 12, further comprising pivotably coupling the light assembly to facilitate positioning of the light assembly at a plurality of different angular extended positions relative to the display member.

17. An electronic device, comprising: a base;
   a display rotatably coupled to the base and an illuminator pivotably coupled to the display and including a biasing mechanism that moves the illuminator to an open position and a locking mechanism that locks the illuminator in a closed position within a recess in the display, wherein both the locking mechanism and the biasing mechanism include a spring.

18. The electronic device of claim 17, wherein the illuminator includes a ratchet-like hinge.

19. The electronic device of claim 17, wherein a housing of the illuminator includes a recess that receives an extension of the locking mechanism to lock the illuminator in a recess of the display.

20. The electronic device of claim 17, wherein the biasing mechanism moves the illuminator to the open position when the display moves to an open position with respect to the base.

* * * * *

UNITED STATES PATENT AND TRADEMARK OFFICE
CERTIFICATE OF CORRECTION

PATENT NO.        : 7,686,466 B2
APPLICATION NO.   : 11/789672
DATED             : March 30, 2010
INVENTOR(S)       : Jeffrey A. Lev et al.

It is certified that error appears in the above-identified patent and that said Letters Patent is hereby corrected as shown below:

In column 3, line 62, in Claim 7, delete "device" and insert -- device, --, therefor.

In column 4, line 49, in Claim 17, delete "base" and insert -- base; --, therefor.

Signed and Sealed this

Eighth Day of June, 2010

David J. Kappos
*Director of the United States Patent and Trademark Office*